United States Patent [19]

Hender

[11] 3,771,032
[45] Nov. 6, 1973

[54] PLURAL ELECTRIC MOTOR CONTROL SYSTEMS

[76] Inventor: Berkeley Stephens Hender, Abergavenny, England

[22] Filed: June 7, 1972

[21] Appl. No.: 260,431

[52] U.S. Cl. .......................... 318/8, 318/45, 318/48
[51] Int. Cl. .............................................. H02p 5/46
[58] Field of Search ............................. 318/8, 45, 48

[56] References Cited
UNITED STATES PATENTS

| 3,161,083 | 12/1964 | Roe .......................... 318/8 X |
| 3,697,763 | 10/1972 | Middlebrook .............. 318/8 X |

Primary Examiner—T. E. Lynch
Attorney—Joseph F. Brisebois et al.

[57] ABSTRACT

An electric motor control system, in which: two coacting electric motors, each having a rotatable armature and rotatable casing and field assemblies, are arranged to afford infinitely-variable speed-control of members driven by them jointly; and the motors are interconnected mechanically and electrically in such manner that, by operation of electrical control means in circuit with the motors, their respective armatures and field assemblies are enabled to rotate at different speeds and, during part of the acceleration and deceleration phases of operation, in opposite directions relative to each other.

7 Claims, 5 Drawing Figures

PLURAL ELECTRIC MOTOR CONTROL SYSTEMS

This invention relates to electric motor control systems, and (although having various other potential applications) is particularly applicable to electrically-driven road vehicles and industrial trucks, electric locomotives and other railway equipment, and electric cranes and lifts.

The aim of the invention is to provide a low-loss electric motor control system of simple character, which is continuously variable and which is capable of being employed over very wide ranges of voltage and current, such as, for example, might arise with homopolar motors.

Basically, the invention is an electric motor control system in which: two coacting electric motors, each having a rotatable armature and rotatable casing and field assemblies, are arranged to afford infinitely-variable speed-control of members driven by them jointly; and the motors are interconnected mechanically and electrically in such manner that, by operation of electrical control means in circuit with the motors, their respective armatures and field assemblies are enabled to rotate at different speeds and, during part of the acceleration and deceleration phases of operation, in opposite directions relative to each other.

Otherwise expressed, the invention provides a means of controlling the respective drives from two electric motors to two output shafts which drive wheels or other machinery; the outputs from the shafts being mechanically and electrically correlated to enable the shafts to operate at different speeds relative to each other, and to provide the full range of speed-control from standstill to maximum speed by means of a low-loss control system.

Referring to the accompanying drawings.

Figure 1:
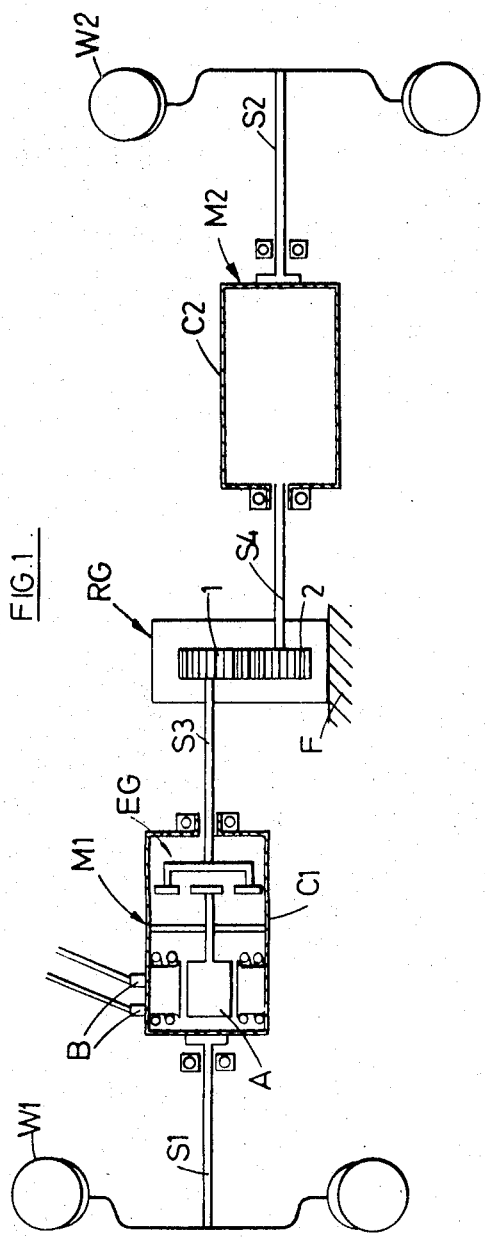
FIG. 1 illustrates schematically one embodiment of the invention.

In the embodiment illustrated in FIG. 1, an electrically driven vehicle (e.g. a battery electric road vehicle or an industrial truck) has two driven wheels W1 and W2 connected, by drive-shafts S1 and S2 respectively, to casings C1 and C2 of two coacting direct current electric motors M1 and M2. Each of the motor casings C1 and C2 is so arranged as to be capable of rotating, and to receive power through brushes B (only one set of which is shown). Each of the motors M1 and M2 has its armature A connected (by an output shaft S3 or S4), to a reversing gearbox RG through gears 1 and 2; and, to provide a suitable rotational speed for the wheels W1 and W2, the motors are preferably fitted with epicyclic gearing EG (or any other form of speed-reduction gearing). The reversing gearbox RG has its housing fixed to a member F of the frame of the vehicle.

By operation of electrical control means (described later), the respective armatures A and field assemblies of the motors M1 and M2 are enabled to rotate at different speeds and, during part of the acceleration and deceleration phases of operation, in opposite directions relative to each other.

When the two motors M1 and M2 are equally energized, the output shafts S3 and S4 to the gearbox RG have torques which oppose each other through the gearing, and therefore the casings C1 and C2 of the motors are forced to rotate so as to drive the wheels W1 and W2 in the same direction, and at the same speed if the vehicle is travelling in a straight line.

Figure 2:
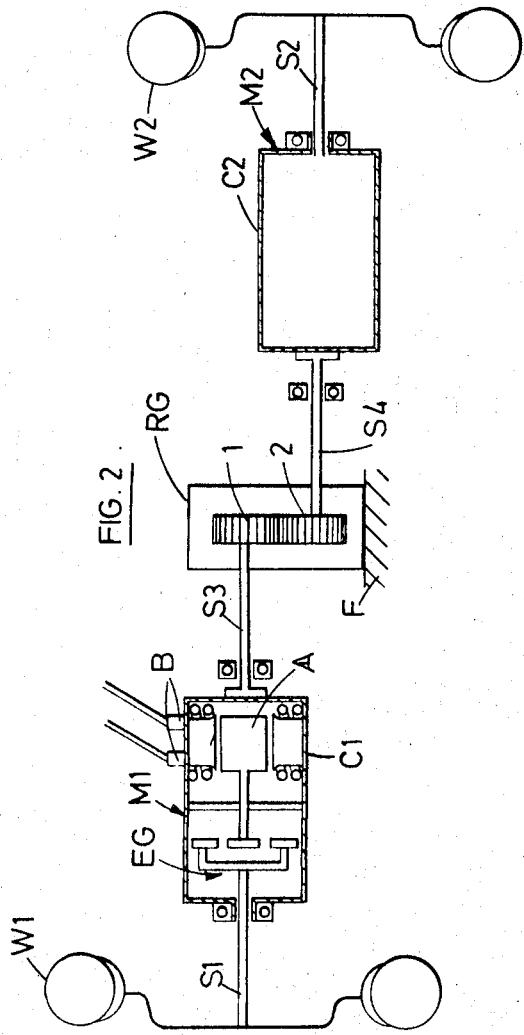
FIG. 2 illustrates schematically another embodiment of the invention.

The embodiment depicted in FIG. 2 differs from that of FIG. 1 by having the motors M1 and M2 physically reversed; so that the drive-shafts S1 and S2 of the wheels W1 and W2 are driven by the corresponding epicyclic gearing EG, and the casings C1 and C2 of the motors are connected to the reversing gearbox RG. But the operation of the motor control system of FIG. 2 is similar to that of FIG. 1.

Figure 3:
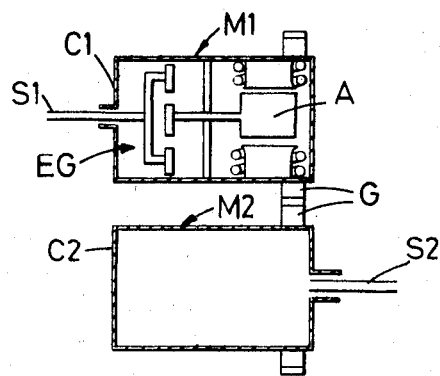
FIG. 3 depicts schematically a modification of the embodiments shown in FIGS. 1 and 2.

FIG. 3 shows a modification which enables the reversing gearbox RG to be eliminated. In this arrangement the casings C1 and C2 of the motors M1 and M2 are fitted with gears G which directly couple one with the other. Otherwise the system operates in the same manner as that of FIG. 2, the drive-shafts S1 and S2 being connected to the respective wheels W1 and W2 (or other rotatable members).

The basic electrical circuit (FIG. 4), which is applicable to any of the schemes shown in FIGS. 1, 2 or 3, has two series-wound motors M1 and M2, with their field windings F1 and F2 respectively, connected in series with each other across a DC supply. A switch SW1 controls the supply to both motors, but a switch SW2 short-circuits the supply to the motor M2. The strength of the field of field winding F2 is controlled by a variable shunt resistance R. If the system is started with the switch SW2 closed, no field can exist in the motor M2 and therefore no torque can be derived by it. Consequently, the motor M1 alone operates and rotates the armature of the motor M2 in the opposite direction to that in which it would normally rotate when the motor M2 is fully energized; this armature, in effect, merely acting as a flywheel. If the resistance R is reduced to its minimal value and the switch SW2 is opened, the current flowing through the motor M1 will then flow through the armature of the motor M2, and partly through the field winding F2 and partly through the resistance R, so that a small torque will appear in the motor M2. The same torque will also appear in the motor M1 which must be equal in torque-rating to the motor M2 at all times.

If the resistance R is gradually increased, the current in the field winding F2 increases steadily and the torque in the motor M2 builds up but its armature is continuing to rotate in the opposite direction relative to the field assembly to that in which it will ultimately rotate relative to the field assembly; and, in consequence its armature will act as a generator, adding voltage to the DC supply to drive the motor M1. At a certain point of the regulation of the resistance R, the strength of the field F2 of the motor M2 will be sufficiently great to produce a torque which will stop the armature of this motor from rotating relative to its own field assembly; and still further increase in the strength of the field F2 will cause the armature to rotate in the normal fully energized direction relative to the field assembly. When the field winding F2 is fully connected to the supply with the resistance R fully out of circuit, the torque will build up to its maximum and both motors will run under equal conditions and in the correct direction for travel of the vehicle wheels W1 and W2 (or for rotation of other members). Thus this system provides a continuously variable control for the motors M1 and M2 from the standstill condition to maximum speed. The kinetic energy of the motors when started, and with the vehicle at standstill or near standstill conditions, assists the syste to drive the vehicle without imposing heavy peak power demands on the motors, thus relieving the power supply system from peak current demands.

Figure 4:
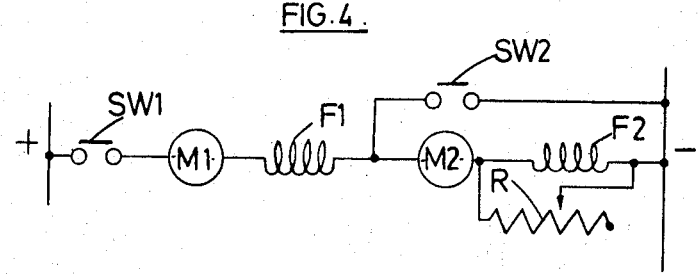
FIG. 4 shows a basic electrical circuit which is applicable to any of the schemes illustrated in FIGS. 1 to 3.
Figure 5:
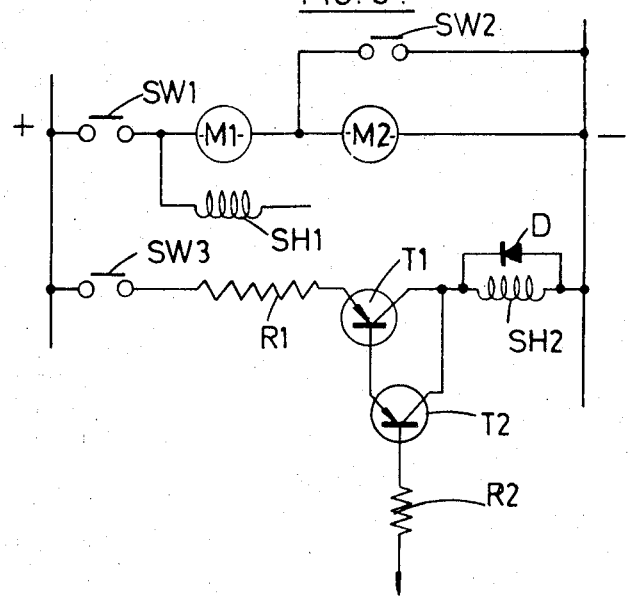
FIG. 5 represents another electrical circuit which can be used with any of the schemes illustrated in FIGS. 1 to 3, as an alternative to the circuit shown in FIG. 4.

In practice, it may be found that the circuit arrangement shown in FIG. 4 entails some difficulty in the design of the resistance R owing to the normal inherently low resistance of the field winding F2. Such difficulty, however, can be obviated by adopting the circuit arrangement shown in FIG. 5. Here the motor M1 has a field winding SH1, and the motor M2 has a field winding SH2. The field winding SH1 may be shunt-connected or it may be compounded or remain series-connected (as the field F1 in FIG. 4), but the field SH2 of the motor M2 is under the influence of a DC chopping circuit which may be transistor-controlled or thyristor-controlled by already well-established means. In this instance the chopping circuit, including for example a rectifier D shunting the field SH2, has two transistors T1 and T2 with associated resistors R1 and R2 connected as shown. The strength of the field SH2 can be controlled by means of the chopping circuit and may be under the influence of a sensing device in the motor circuit, so as to relate the strength of the field SH2 to the demand of the motor M2. If desired, the field SH1 of the motor M1 can be simultaneously influenced by the chopping circuit so as to provide the required overall torque speed and power characteristic to drive the load.

In this circuit arrangement the switch SW2 shorts out the armature of the motor M2 for starting purposes, and, at the appropriate time, this switch is opened to allow the armature of the motor M2 to build up torque under the influence of the field provided by SH2. The circuits are under the influence of the switches SW1 and SW3, which are employed to isolate the motor and the field circuits from the DC supply when necessary.

It will be appreciated that several variations of the circuit arrangements are possible, and those described are examples to illustrate the working of the invention. It is also desired to point out that when the output shafts of the system are driving (as in the case of a vehicle travelling downhill or being decelerated), the motors may be made to act as generators and to return energy to the battery or other source of energy.

It is possible for the system to be regenerative over a wide speed range through the ability of the vehicle operator to increase the field strength in each of the motors M1 and M2 simultaneously or independently, thus causing the motors to increase their back e.m.f. to exceed the voltage of the supply and to feed current back into that supply, thus providing electrical braking. This could occur down to approximately one-third of full speed. In applications requiring a single drive-shaft output the shafts S1 and S2 may be mechanically joined by a layshaft and gears, or by similar means.

The main advantages afforded by the invention may be summarised as follows:

1. A continuously variable speed-control from zero to maximum speed, which may be applied to controlling the speed of a vehicle or other machinery.
2. A continuously variable control system having an inherently simple input control.
3. A control system which may be regenerative over a wide speed range and which, therefore, is capable of providing electrical braking.
4. A system of control suitable for a wide range of applied voltages, and therefore currents, since the main control device affects only the field, and does not connect into the heavy-current or high-voltage circuitry.

I claim:

1. An electric motor system, comprising; a first electric motor and a first driven member, said motor comprising first and second independently rotatable rotors, one of which constitutes a motor armature while the other constitutes a casing and field winding, the first of said independently rotatable rotors being connected to drive said first driven member; a second electric motor and a second driven member, said second motor comprising third and fourth independently rotatable rotors, one of which constitutes a second motor armature while the other constitutes a second casing and field winding, said third independently rotatable rotor being connected to drive said second driven member; intercoupling drive means between said second and fourth independently rotatable rotors through which rotation of one of said second and fourth rotors produces opposite rotation of the other, whereby, the reaction torque on said first motor due to the driving thereby of said first driven member is sustained by the second motor, and vice versa; electrical circuitry connecting the armatures and field windings of said first and second motors to a common electrical supply, and including switch means for removing the current supply from the armature of said second motor without interrupting the supply to the first motor, and electrical control means for changing the field current of said second motor.

2. An electtic motor control system according to claim 1, in which each of the motors has its armature connected through gearing to a reversing gearbox, and has its casing arranged to drive the corresponding driven member.

3. An electric motor control system according to claim 1, in which each of the motors has its rotatable casing connected to a reversing gearbox, and has its armature connected through gearing to the corresponding driven member.

4. An electric motor control system according to claim 1, in which the motors have their casings coupled together by gearing, and each motor armature drives the corresponding driven member.

5. An electric motor control system according to claim 1, in which the drive to each of the driven members is transmitted by epicyclic gearing or other speed-reduction gearing.

6. An electric motor control system according to claim 1, in which the two motors are series-wound and have their field windings connected in series with each other across a DC supply; a switch is arranged so that it can short-circuit the supply to one of the motors; and the same motor has the strength of its field controlled by a variable shunt resistance.

7. An electric motor control system according to claim 1, in which the two motors are connected across a DC supply, and the field of one or of each of them is arranged to be influenced by a DC chopping circuit which is electronically controlled.

* * * * *